(12) United States Patent
Auten (10) Patent No.: US 8,558,424 B2
(45) Date of Patent: Oct. 15, 2013

(54) SUSPENDED ROTORS FOR USE IN ELECTRICAL GENERATORS AND OTHER DEVICES

(76) Inventor: Clifford Neal Auten, Whitney, TX (US)

(*) Notice: Subject to any disclaimer, the term of this patent is extended or adjusted under 35 U.S.C. 154(b) by 440 days.

(21) Appl. No.: 12/909,731

(22) Filed: Oct. 21, 2010

(65) Prior Publication Data

US 2012/0098369 A1 Apr. 26, 2012

(51) Int. Cl.
*H02K 7/09* (2006.01)
(52) U.S. Cl.
USPC .......................................................... 310/90.5
(58) Field of Classification Search
USPC .......................................................... 310/90.5
See application file for complete search history.

(56) References Cited

U.S. PATENT DOCUMENTS

| | | | |
|---|---|---|---|
| 6,011,334 A * | 1/2000 | Roland | 310/86 |
| 6,527,521 B2 | 3/2003 | Noda | |
| 6,527,699 B1 | 3/2003 | Goldowsky | |
| 6,741,000 B2 | 5/2004 | Newcomb | |
| 6,798,080 B1 | 9/2004 | Baarman et al. | |
| 6,957,947 B2 | 10/2005 | Williams | |
| 7,192,244 B2 | 3/2007 | Grande, III et al. | |
| 7,696,633 B2 | 4/2010 | Zajchowski et al. | |
| 2001/0009645 A1 * | 7/2001 | Noda | 417/355 |
| 2010/0148512 A1 | 6/2010 | Pitre | |

FOREIGN PATENT DOCUMENTS

| | | | |
|---|---|---|---|
| CN | 101526068 A | | 9/2009 |
| EP | 0903835 A1 | | 3/1999 |
| GB | 2134991 A | * | 8/1984 |
| WO | WO2009/098057 A1 | | 8/2009 |

* cited by examiner

*Primary Examiner* — Tran Nguyen
*Assistant Examiner* — David Scheuermann
(74) *Attorney, Agent, or Firm* — Afghani Law Firm; Kevin Afghani (57) ABSTRACT

Apparatuses employing suspended rotors are provided. In one embodiment, an apparatus includes a housing forming an internal cavity and a rotor disposed in the internal cavity of the housing. The rotor has a first end and a second end. The apparatus also includes a first end ring coupled to the first end of the rotor and a second end ring coupled to the second end of the rotor. The first end ring and the second end ring are each magnetically repulsed from the housing to cause the rotor to be suspended relative to the housing.

20 Claims, 7 Drawing Sheets

SUSPENDED ROTORS FOR USE IN ELECTRICAL GENERATORS AND OTHER DEVICES

TECHNICAL FIELD

The illustrative embodiments relate generally to suspended rotors, and more particularly, to suspended rotors usable by electrical generators and other devices.

BACKGROUND

Motors, electrical generators, and other devices employing rotors are widely used today. However, current rotor-based systems often suffer from high levels of friction between the rotor and the rotor's surrounding parts, thereby reducing the overall efficiency of the system. For example, many current rotor-based systems may experience high levels of friction due to the rotor being mechanically connected to surrounding parts. Current rotor-based systems may also fail to effectively employ multiple flow passages in and around the rotor to facilitate cooling, propulsion, or other purposes. Also, current electrical generators may not be able to be employed within existing fluid conduits, such as water pipes or sewage lines.

SUMMARY

According to an illustrative embodiment, an apparatus includes a housing forming an internal cavity and a rotor disposed in the internal cavity of the housing. The rotor has a first end and a second end. The apparatus also includes a first end ring coupled to the first end of the rotor and a second end ring coupled to the second end of the rotor. The first end ring and the second end ring are each magnetically repulsed from the housing to cause the rotor to be suspended relative to the housing.

According to another illustrative embodiment, an apparatus includes a housing forming an internal cavity. The housing includes one or more coils. The apparatus also includes a rotor disposed in the internal cavity of the housing. The rotor has a first end and a second end. The rotor has an internal surface forming an internal flow passage. The rotor also includes one or more rotor magnets. The apparatus includes a fin coupled to the internal surface of the rotor, a first end ring coupled to the first end of the rotor, and a second end ring coupled to the second end of the rotor. The first and second end rings are magnetically repulsed from the housing to cause the rotor to be suspended relative to the housing. The fin is operable to engage with fluid flowing through the internal flow passage to cause the rotor to rotate and the) one or more rotor magnets to move relative to the one or more coils.

According to another illustrative embodiment, an apparatus includes a housing having an internal surface forming an internal cavity and a rotor disposed in the internal cavity of the housing. The rotor has an internal surface forming an internal flow passage. The apparatus includes a fin coupled to the internal surface of the rotor such that the fin is at least partially disposed in the internal flow passage. The rotor is magnetically suspended within the internal cavity of the housing to form an outer flow space between the rotor and the internal surface of the housing. The internal flow passage and the outer flow space are operable to transmit fluid in a same direction. The fin is operable to engage with fluid flowing through the internal flow passage to cause the rotor to rotate.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Referring to FIGS. 1 through 7, an illustrative embodiment of an electrical generator 100 includes a rotor 102 disposed in an internal cavity 104 of a housing 106. In one embodiment, the housing 106 may be a stator. The rotor 102 is suspended in a non-touching, or substantially non-touching, relationship with the housing 106 due to magnetic repulsion between the rotor 102 and components of the electrical generator 100 surrounding the rotor 102. The suspension of the rotor 102 within the internal cavity 104 of the housing 106 creates an outer flow space 108 between the rotor 102 and the internal surface 110 of the housing 106. The minimization or absence of physical contact between the rotor 102 and the housing 106, or other portions of the electrical generator 100, reduces or eliminates friction caused by rotation of the rotor 102. Unless otherwise indicated, as used herein, "or" does not require mutual exclusivity.

In the embodiment of FIGS. 1 to 7, the electrical generator 100 is in fluid communication with a fluid conduit 112, and is positioned in-line with the fluid conduit 112. In particular, a first end 114 of the electrical generator 100 is coupled to an upstream portion 116 of the fluid conduit 112, and a second end 118 of the electrical generator 100 is coupled to a downstream portion 120 the fluid conduit 112. Since the electrical generator 100 is installed in-line with the fluid conduit 112 in this manner, fluid (e.g., a liquid or gas) exits the upstream portion 116 of the fluid conduit 112 and enters an internal flow passage 122 of the rotor 102, where the passage of fluid through the internal flow passage 122 causes the rotor 102 to rotate as described in further detail below. The fluid then exits the internal flow passage 122 of the rotor 102 and flows into the downstream portion 120 of the fluid conduit 112. As described below, the fluid may also flow through the outer flow space 108 in the same direction as the fluid passing through the internal flow passage 122 of the rotor 102.

As used herein, the term "coupled" includes coupling via a separate object and includes direct coupling. The term "coupled" also encompasses two or more components that are continuous with one another by virtue of each of the components being formed from the same piece of material. Also, the term "coupled" may include chemical, such as via a chemical bond, mechanical, thermal, magnetic, or electrical coupling.

Figure 1:
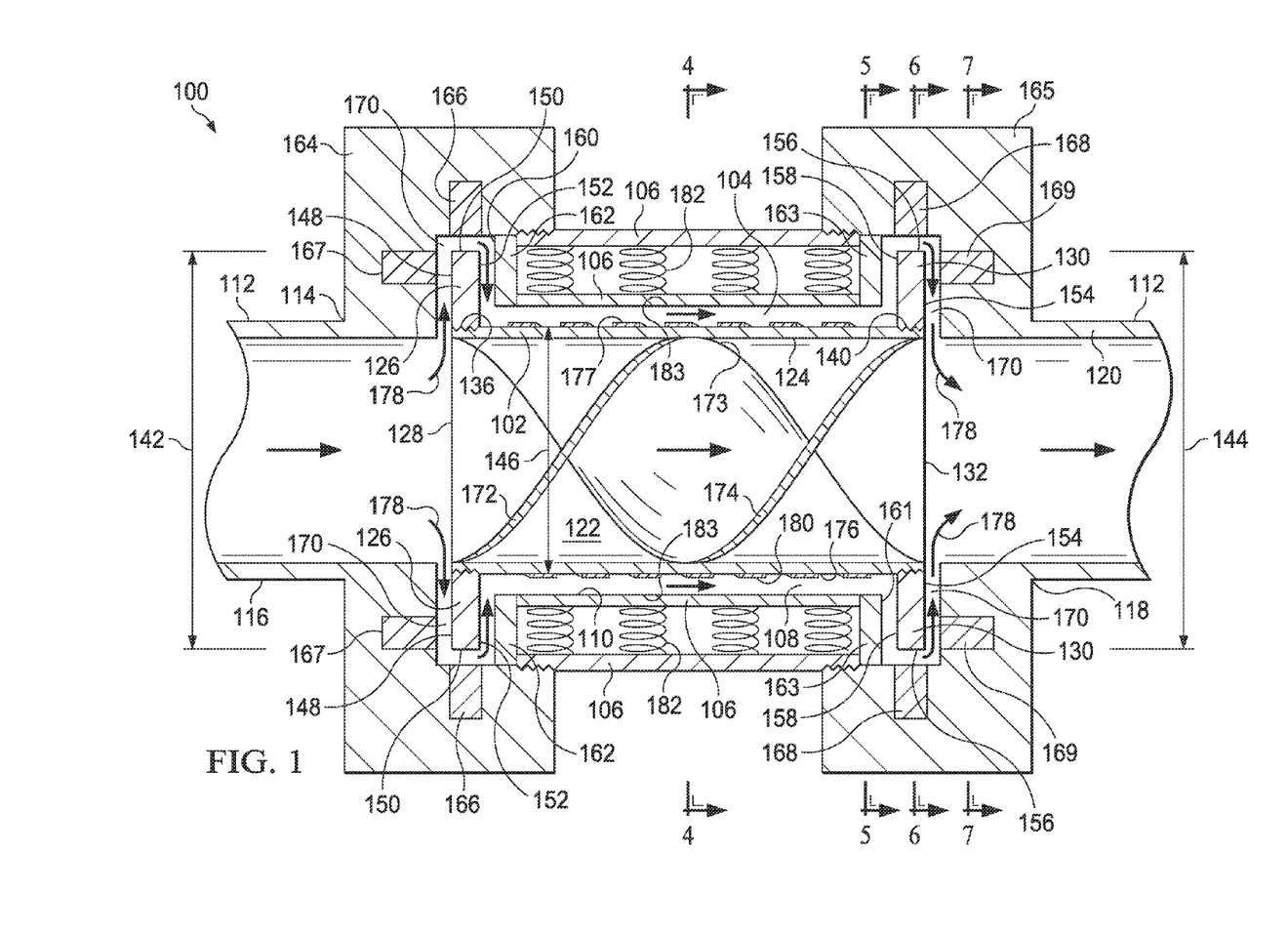
FIG. 1 is a schematic, cross-section view of a suspension system employed in an electrical generator according to one illustrative embodiment.
Figure 2:
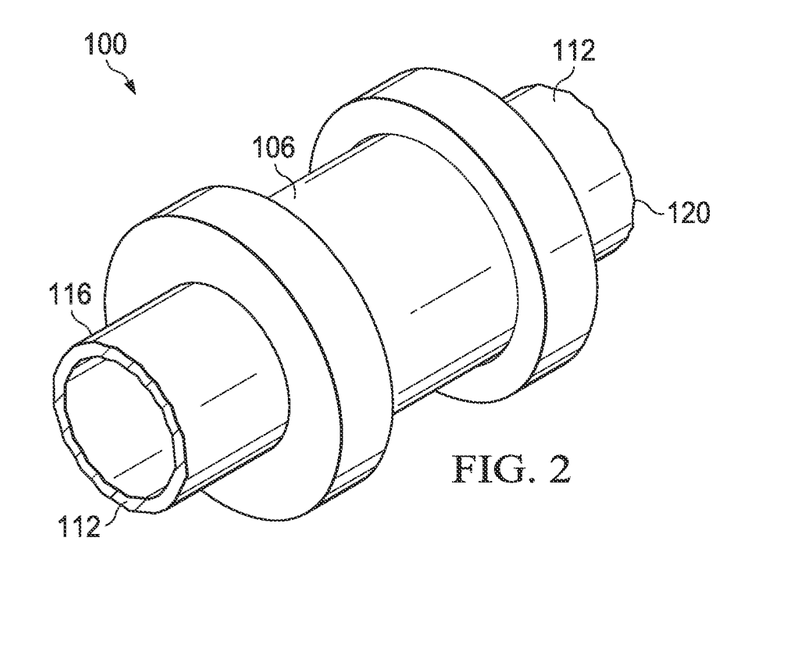
FIG. 2 is a schematic, perspective view of the electrical generator shown in FIG. 1.

The rotor 102 may have an internal surface 124, which forms the internal flow passage 122 through which fluid may flow. The rotor 102 may have a cylindrical, or approximately cylindrical, shape. In other embodiments, the rotor 102 may have any shape or configuration that permits the rotor 102 to rotate within the internal cavity 104 of the housing 106.

The electrical generator 100 includes a suspension system that utilizes magnets to prevent, or help prevent, the rotor 102 from physically contacting the housing 106 and other parts of the electrical generator 100. The suspension system includes a first end ring 126 coupled to a first end 128 of the rotor, and a second end ring 130 coupled to a second end 132 of the rotor 102. In one embodiment, the first end ring 126 forms a first aperture 134 that is defined by a first inner end ring surface 136. Similarly, the second end ring 130 may form a second aperture 138 that is defined by a second inner end ring surface 140. The first inner end ring surface 136 may be coupled to the first end 128 of the rotor 102 and the second inner end ring surface 140 may be coupled to the second end 132 of the rotor 102. The coupling between the first and second inner end ring surfaces 136, 140 and the rotor 102 may be by any mechanism, including, but not limited to, an interference fit, a screwed or threaded connection, a welded connection, etc.

Figure 3:
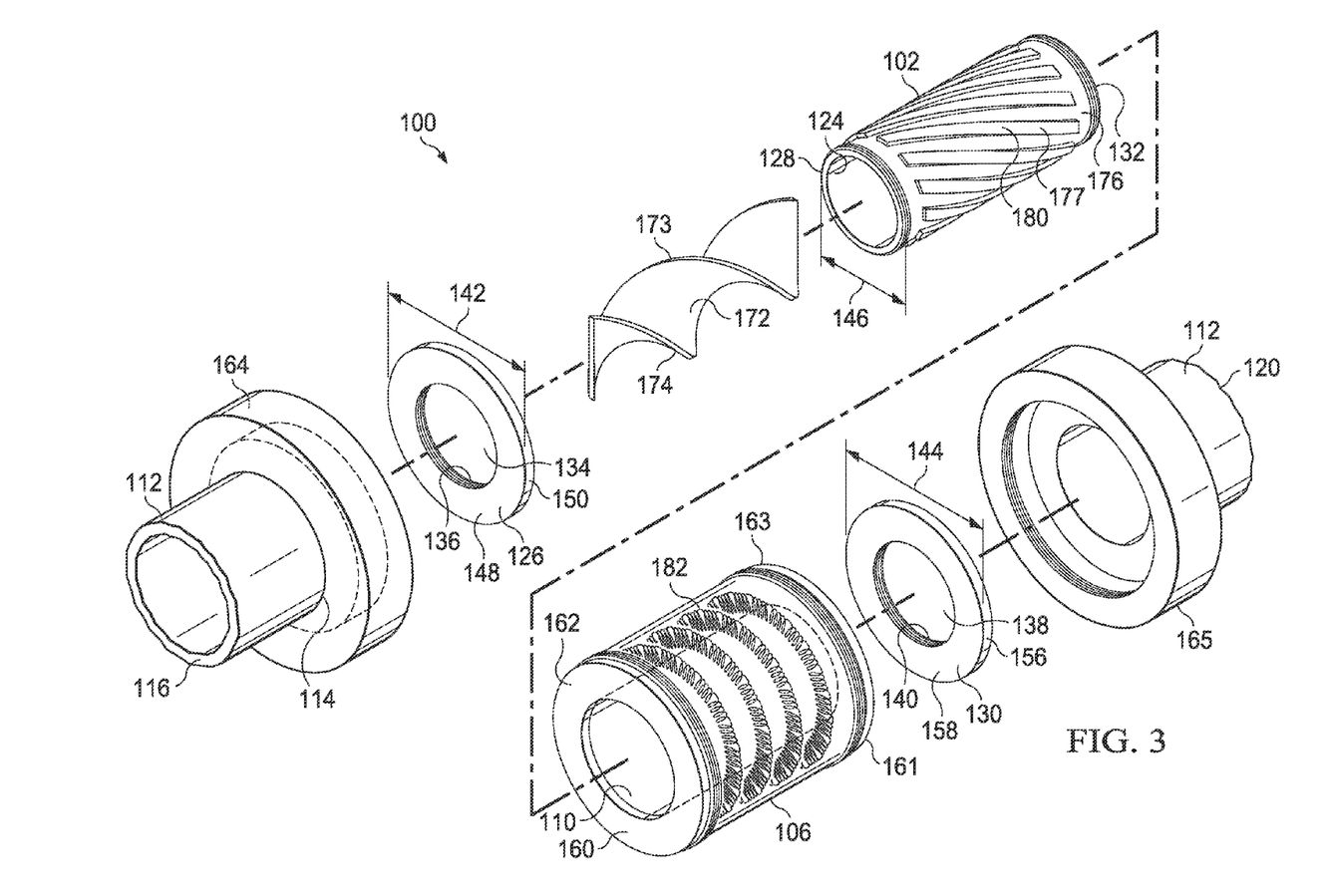
FIG. 3 is a schematic, exploded view of the electrical generator shown in FIG. 1.

As shown in FIG. 3, the first and second end rings 126, 130 have a ring shape. Each of the first and second end rings 126 and 130 have an outer diameter 142 and 144, respectively. In one embodiment, the outer diameters 142, 144 of the first and second end rings 126, 130 are each larger than the diameter 146 of the rotor 102. The difference between (1) either of the outer diameters 142 or 144 of the first or second end rings 126 or 130, and (2) the diameter 146 of the rotor 102, may be any distance depending upon the embodiment (e.g., 1 mm, 1 cm, 1 inch, 1 meter, etc.).

In one embodiment, the suspension of the rotor 102 within the internal cavity 104 of the housing 106 may be caused by the magnetic repulsion of the first and second end rings 126, 130 from magnets in the housing 106 and elsewhere in the electrical generator 100. The first and second end rings 126, 130 may be covered by end ring magnets or themselves be magnets having a particular polarity (e.g., positive, negative, north, or south). In the example in which the first and second end rings 126, 130 are covered by end ring magnets, the magnets may be flat, or sheet-like, end ring magnets that cover all or a portion of the surfaces of the first and second end rings 126, 130. For example, the sheet-like end ring magnets may cover the outer-facing surface 148, the circumferential surface 150, the inner-facing surface 152, or any combination or portion of these surfaces, of the first end ring 126. Similarly, sheet-like end ring magnets may cover the outer-facing surface 154, the circumferential surface 156, the inner-facing surface 158, or any combination or portion of these surfaces, of the second end ring 130. In the example in which the first and second end rings 126, 130 are themselves magnetic, the first and second end rings 126, 130 may be partially or fully made from a magnetic material, or a material capable of being magnetized.

In one embodiment, the suspension of the rotor 102 is partially or fully caused by the magnetic repulsion between the first and second end rings 126, 130 and magnets placed on the ends of the housing 106. In this embodiment, the housing 106 may have a first end 160 that faces a portion of the first end ring 126, such as the inner-facing surface 152 of the first end ring 126. The housing 106 may also have a second end 161 that faces a portion of the second end ring 130, such as the inner-facing surface 158 of the second end ring 130. The first and second ends 160, 161 of the housing 106 may include a first and second housing magnet 162, 163, respectively. The first and second housing magnets 162, 163 may have a ring-like shape (as shown in FIG. 3), or any other shape that allows the housing magnets 162, 163 to face the end rings 126, 130. Also, the magnetic polarity of the first and second housing magnets 162, 163 may match the magnetic polarity of the first and second end rings 126, 130 to create a repulsive magnetic force between the housing magnets 162, 163 and the end rings 126, 130, thereby creating a space between these elements.

In one embodiment, the suspension system of the electrical generator 100 may include a first rotor interface 164 adjacent the first end 128 of the rotor 102, and a second rotor interface 165 adjacent the second end 132 of the rotor 102. The first rotor interface 164 may be coupled to the housing 106 at or near the first end 160 of the housing 106. The second rotor interface 165 may be coupled to the housing 106 at or near the second end 161 of the housing 106. The coupling between the housing 106 and the first and second rotor interfaces 164, 165 may be by any mechanism, including, but not limited to, an interference fit, a screwed or threaded connection, a welded connection, etc. The first and second interfaces 164, 165 may provide an interface between the rotor 102 and any other component or structure. In the example of FIGS. 1 through 7, the first and second rotor interfaces 164, 165 interface the rotor 102 to the upstream portion 116 and downstream portion 120, respectively, of the fluid conduit 112. In one example, the first rotor interface 164 may be fully or partially disposed between the first end 128 of the rotor 102 and the upstream portion 116 of the fluid conduit 112. Also, the second rotor interface 165 may be fully or partially disposed between the second end 132 of the rotor 102 and the downstream portion 120 of the fluid conduit 112.

The first and second rotor interfaces 164, 165 may each include one or more interface magnets that magnetically interact with the first and second end rings 126, 130 to suspend the rotor 102. In one embodiment, the first rotor interface 164 includes a first circumferential interface magnet 166 and a first outer interface magnet 167. The second rotor interface 165 may include a second circumferential interface magnet 168 and a second outer interface magnet 169. The first circumferential interface magnet 166 may have a ring shape, and be adjacent, or face, the circumferential surface 150 of the first end ring 126. The first outer interface magnet 167 may also have a ring shape and be adjacent, or face, the outer-facing surface 148 of the first end ring 126. Similarly, the second circumferential interface magnet 168 may have a ring shape, and be adjacent, or face, the circumferential surface 156 of the second end ring 130. The second outer interface magnet 169 may also be ring shaped, and may be adjacent, or face, the outer-facing surface 154 of the second end ring 130. While the interface magnets 166, 167, 168, 169, as well as the housing magnets 162, 163, are shown to be ring shaped, these magnets may have any other shape that facilitates the suspension of the rotor 102. In addition, these magnets may, in one embodiment, not be continuous, but instead be a set of smaller magnets that form a larger shape, such as a ring.

The first circumferential interface magnet 166 and the first outer interface magnet 167 may have the same magnetic polarity as the first end ring 126. Also, the second circumferential interface magnet 168 and the second outer interface magnet 169 may have the same magnetic polarity as the second end ring 130. In the embodiment described in FIGS. 1 to 7, the inner-facing surfaces 152, 158, the circumferential surfaces 150, 156, and the outer-facing surfaces 148, 154 of the first and second end rings 126, 130 are each facing, or adjacent, a respective magnet 162, 163, 166, 168, 167, 169 in the first or second rotor interfaces 164, 165 or the housing 106. Because the magnetic polarity of the first and second end rings 126, 130 matches the magnetic polarities of the surrounding magnets 162, 163, 166, 168, 167, 169, the first and second end rings 126, 130 are magnetically repulsed from the surrounding magnets 162, 163, 166, 168, 167, 169, thereby creating a space 170 around the surfaces 148, 150, 152, 154, 156, 158 of the first and second end rings 126, 130. This lack, or substantial lack, of physical contact between the rotor 102, along with the first and second end rings 126, 130, on one hand, and the surrounding structure in the electrical generator 100, on the other hand, reduces or eliminates friction that would be caused by the rotor 102 physically contacting other elements of the electrical generator 100 while the rotor 102 rotates. As described in further detail below, space 170 may also allow fluid from the fluid conduit 112 to flow into the outer flow space 108 and out toward the second end 132 of the rotor 102, as indicated by arrows 178.

Figure 4:
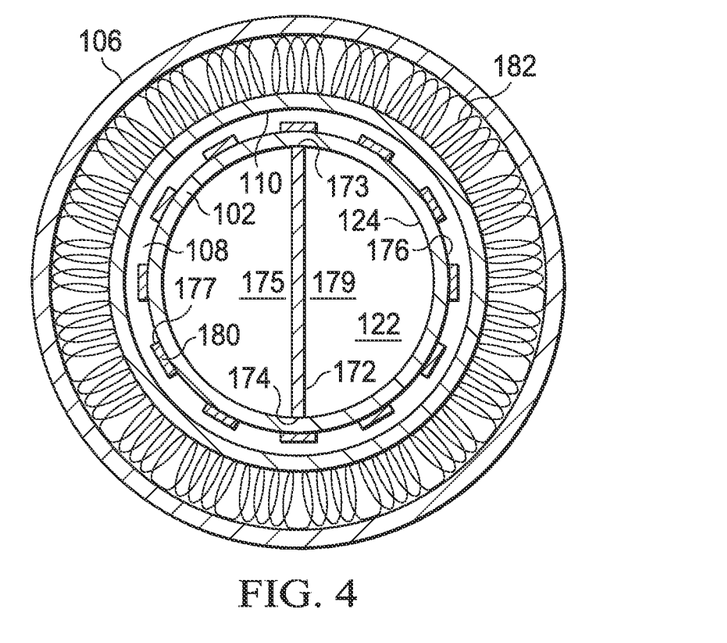
FIG. 4 is a schematic, cross-section view of a portion of the electrical generator of FIG. 1 taken along line 4-4.
Figure 5:
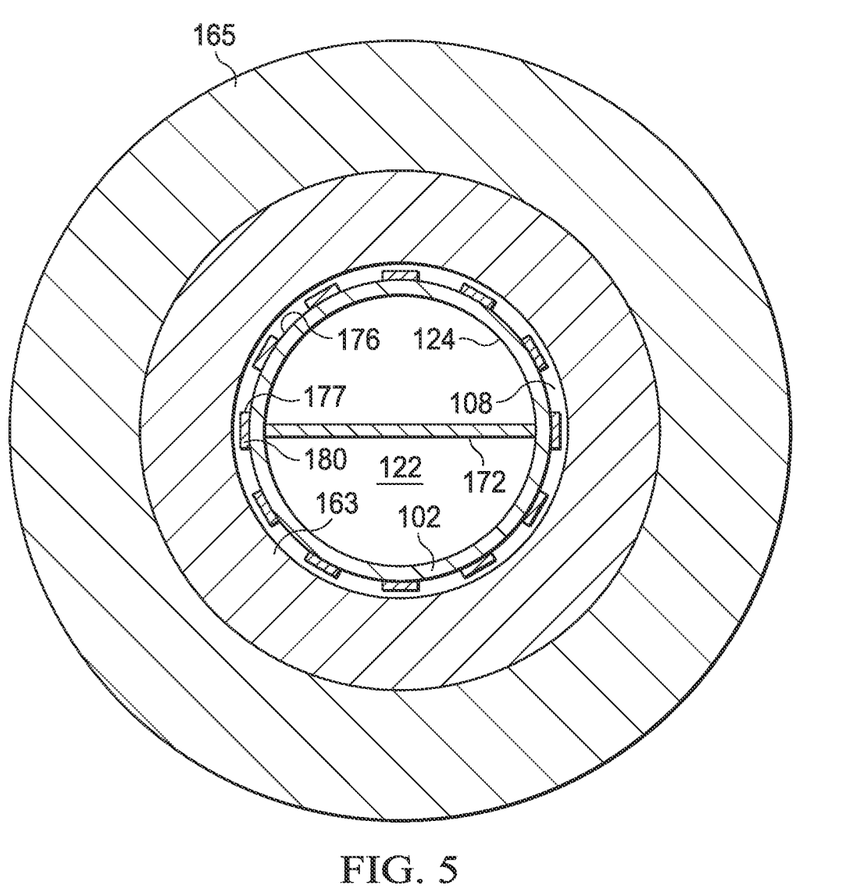
FIG. 5 is a schematic, cross-section view of a portion of the electrical generator of FIG. 1 taken along line 5-5.
Figure 6:
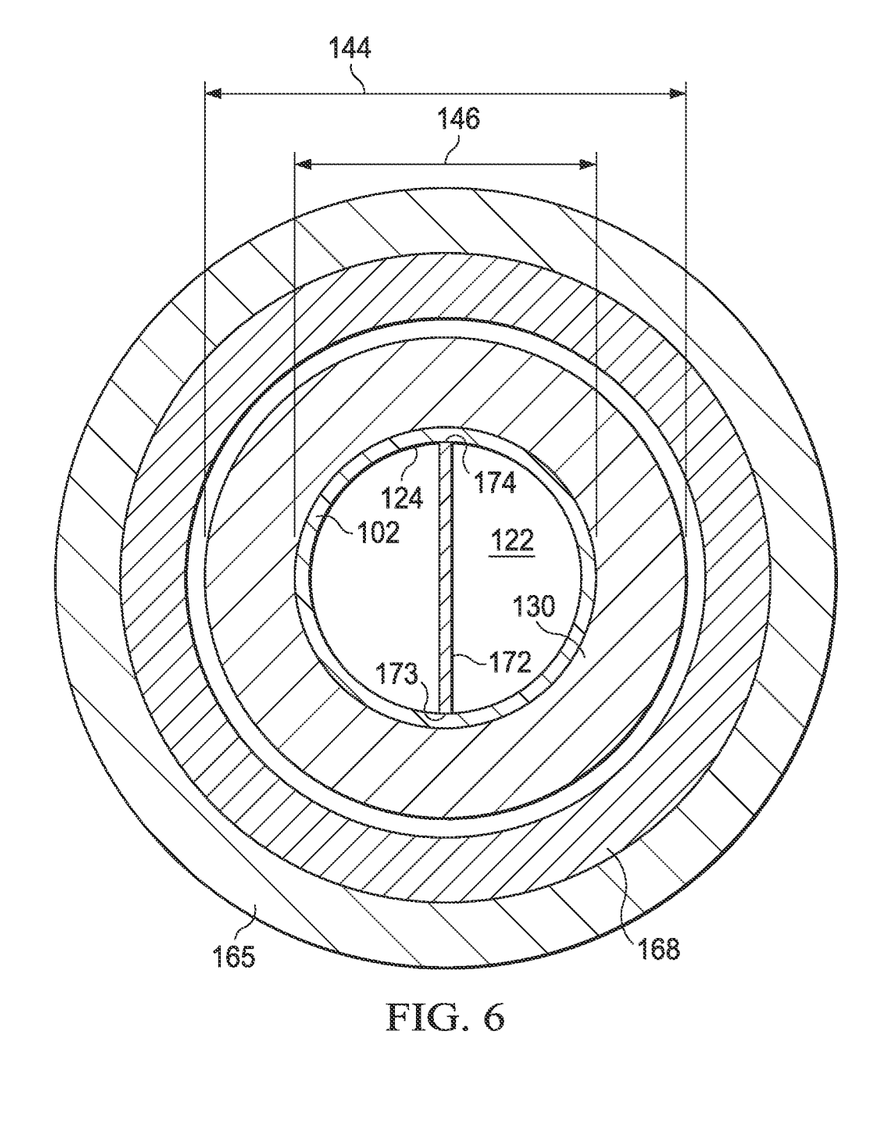
FIG. 6 is a schematic, cross-section view of a portion of the electrical generator of FIG. 1 taken along line 6-6.
Figure 7:
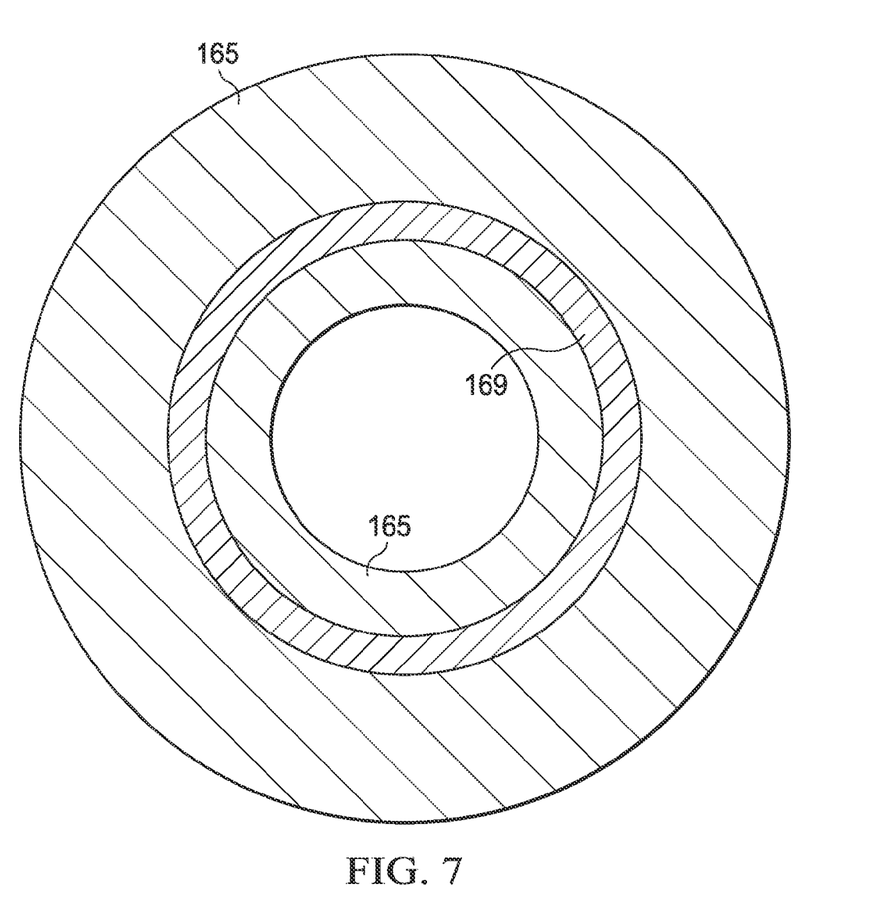
FIG. 7 is a schematic, cross-section view of a portion of the electrical generator of FIG. 1 taken along line 7-7.

The rotation of the rotor 102 about its longitudinal axis may be caused by fluid engaging with a fin 172 as the fluid passes through the internal flow passage 122 of the rotor 102. At least one edge of the fin 172 may be fixedly coupled to the internal surface 124 of the rotor 102. In the example of FIGS. 1 to 7, the fin 172 is a spiraling fin having a spiraling plane structure, and which has a first longitudinal edge 173 and a second longitudinal edge 174. In one embodiment, each of the first and second longitudinal edges 173, 174 is fixedly coupled to the internal surface 124 of the rotor 102. As seen from FIGS. 4 through 6, the fin 172 may also bisect the internal flow passage 122 of the rotor 102 along the longitudinal direction, although other configurations in which the fin 172 is not substantially centered (as shown in FIG. 4-6) are possible. In one embodiment, the fin 172 may assume a flatter, or non-rotating, structure toward the ends 128, 132 of the rotor 102.

As the fluid passes through the internal flow passage 122 of the rotor 102, the fluid engages with, or pushes, a side of the fin 172 so as to cause the fin 172, as well as the fixedly attached rotor 102, to rotate about the rotor's longitudinal axis. As the fluid engages with the fin 172, the space 175 on one side of the fin 172 may have a higher pressure than the space 179 on the other side of the fin 172.

The structure of the fin 172 may also be altered. For example, the number of turns, or 360-degree spirals, per unit of longitudinal length of the fin 172 may be varied to cause the rotor 102 to rotate at varying speeds. For example, if a faster rotation of the rotor 102 is desired, the number of structural turns of the fin 172 within the internal flow passage 122 may be increased.

The rotation of the rotor 102 may be further aided or caused by the passage of fluid through the outer flow space 108. In this embodiment, the outer surface 176 of the rotor 102 may include one or more strips 177 that partially or fully spiral around the outer surface 176 of the rotor 102. The strips 177 may protrude any distance from the outer surface 176 of the rotor 102, depending upon the embodiment. Fluid from the fluid conduit 112 may enter the outer flow space 108 through the space 170 at least partially surrounding the first and second end rings 126, 130, as indicated by the arrows 178. The fluid passing through the outer flow space 108 engages with the protruding strips 177 to cause the rotor 102 to rotate in the same direction caused by the engagement between the fluid and the fin 172. It is also noted that the fluid from the fluid conduit 112 moves through both the outer flow space 108 and the internal flow passage 122 in the same direction.

In the embodiment of FIGS. 1 through 7, the described suspension system is used in conjunction with the electrical generator 100. However, the suspension system described above may be employed in any device that uses a rotor. For example, the suspension system may be employed in conjunction with a motor. In the embodiment in which the suspension system is employed by the electrical generator 100, the rotor 102 may include one or more rotor magnets 180 on or at the outer surface 176 of the rotor 102. In the non-limiting embodiment shown in FIGS. 1 through 7, the rotor magnets 180 are the strips 177 described above. However, the rotor magnets 180 may have any shape that allows the rotor 102 to rotate within the internal cavity 104 of the housing 106. Also, the rotor magnets 180 may be flush with, and not protrude from, the outer surface 176 of the rotor. In another embodiment, the rotor 102 may itself be a magnet or a magnetized material.

The electrical generator 100 may also include one or more coils 182 that are included in the housing 106. The coils 182 may be any metal, such as a conductive metal, copper, etc. In one embodiment, the housing 106 includes two concentric cylindrical walls, between which the coils 182 are located, as shown in FIGS. 1, 3, and 4. As the rotor 102 rotates about its longitudinal axis due to the passage of fluid as described above, the rotor magnets 180, which are affixed to the rotor 102, may move, or spin, relative to the coils 182 in the housing 106, thereby creating an electric current that may be used for any purpose. The wall 183 of the housing 106 defining the internal cavity 104, in one embodiment, may be sufficiently thin to allow for the production of electricity when the rotor magnets 180 move relative to the coils 182. Also, the passage of fluid through the outer flow space 108 may serve to cool, maintain, or lower the temperature of the coils 182. The electricity produced by the electrical generator 100 may be AC or DC, depending on the configuration. The number of rotor magnets 180 or coils 182 may be varied depending on the amount of electricity desired. In an alternate embodiment, the rotor 102 may contain coils and the housing 106 may contain magnets.

When the electrical generator 100 is used in conjunction with a fluid conduit 112, the type of fluid conduit 112, as well as the fluid flowing therethrough, may vary. For example, the fluid conduit 112 may be a water pipe. In an alternate embodiment, the fluid conduit 112 may be a sewage pipe and the fluid flowing through the rotor 102 may be sewage. In this alternative embodiment, the internal flow passage space 175 or 179 that may normally be considered the reduced-pressure side of the fin 172 may be blocked off to prevent the sewage from flowing through that portion of the internal flow passage 122. Therefore, sewage may only be allowed to flow through the increased, or positive-pressure portion, of the internal flow passage 122. By blocking off the reduced-pressure portion of the internal flow passage 122, clogging and blockage may be reduced or prevented. The reduced-pressure portion of the internal flow passage 122 may also be blocked when any thick or solid-inclusive fluid is used. Also, when a thick or solid-inclusive fluid is used, the outer flow space 108 may be blocked from transmitting the thicker fluid. Instead, water or relatively thinner fluid may be transmitted through the outer flow space 108 from an alternative source to cool the coils 182 or for another purpose.

In an alternate embodiment, in lieu of or in addition to causing the rotational propulsion of the rotor 102 using the fluid flowing therethrough, a motor (not shown) may be operationally coupled to an end of the fin 172 at an end 128, 132 of the rotor 102. The motor may rotate the fin 172, and therefore the rotor 102, about the rotor's 102 longitudinal axis. In one example, the motor may be used to increase the rotational speed of the rotor magnets 180 relative to the coils 182, thereby producing additional electricity. The motor may be coupled to an end of the fin 172 using a U-shaped bracket that clamps onto an end of the fin 172. In one embodiment, the U-shaped bracket may surround three sides of an end of the fin 172. Also, the U-shaped bracket does not necessarily have to make physical contact with the end of the fin 172, and may instead be magnetically coupled with the end of the fin 172 in a manner that causes the fin 172 to spin when the motor is running.

The magnets described above may be static magnets or magnets that retain their polarity even in the absence of external stimuli. In an alternative embodiment, all or a portion of the magnets in the illustrative embodiments may be electromagnets. Also, all or a portion of the magnets described above may be dual-polarity magnets, and the polarities referred to above may reference the polarity of the portion of the magnet facing or interfacing the end rings 126, 130 or other respective repulsing element.

Figures 8, 9:
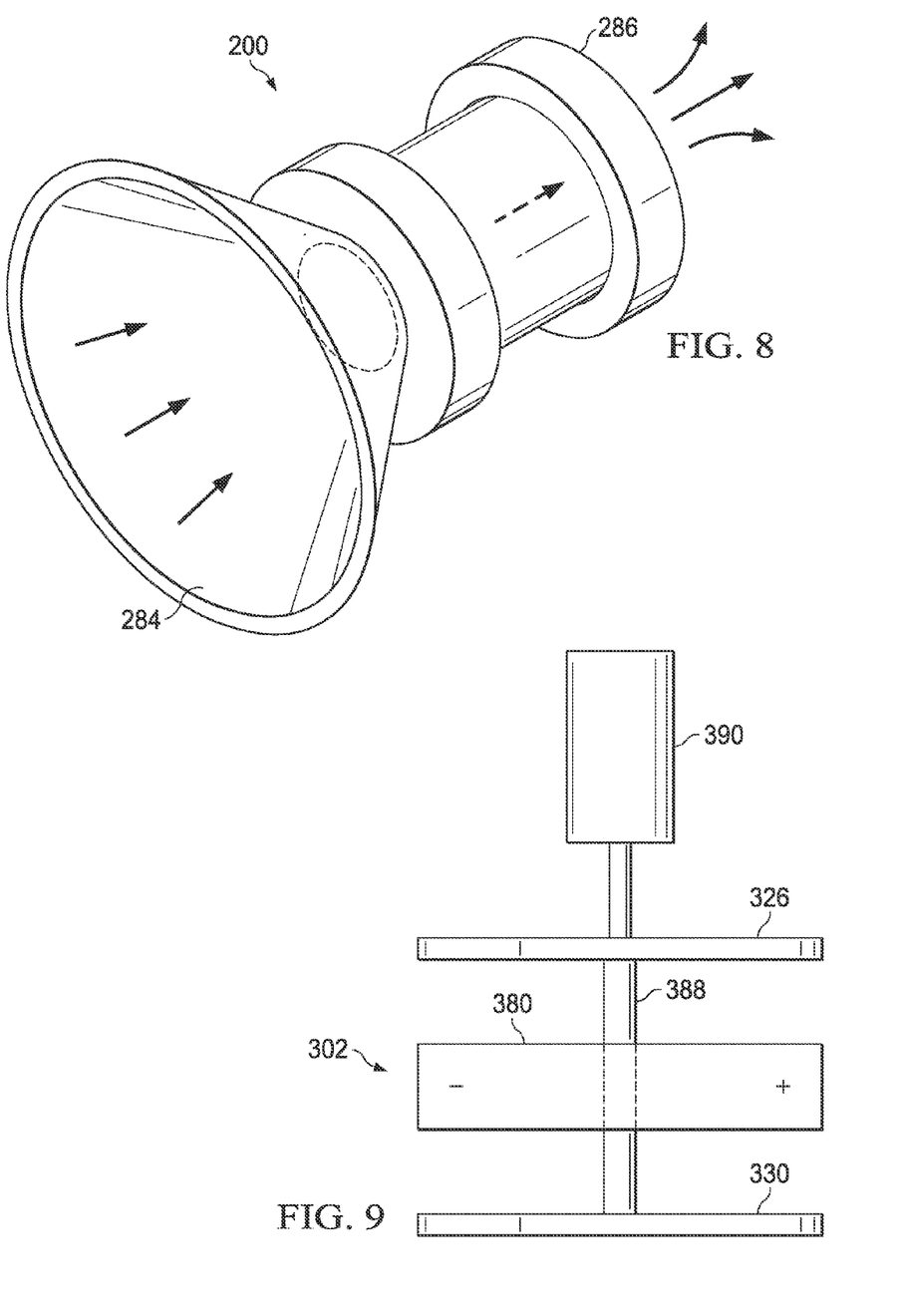
FIG. 8 is a schematic, perspective view of an electrical generator for use in an open flowing system according to one illustrative embodiment.
FIG. 9 is a schematic, plan view of a rotor employed in conjunction with a motor according to an illustrative embodiment.

Referring to FIG. 8, an illustrative embodiment of the electrical generator 200 is shown that is positionable within an open-flowing fluid system. Elements of FIG. 8 that are analogous to elements in FIGS. 1-7 have been shown by indexing the reference numerals by 100. In contrast to the electrical generator 100 shown in FIGS. 1 through 7, which is coupled and in fluid communication with an external fluid conduit at both ends, the electrical generator 200 shown in FIG. 8 may be positioned in any open-flowing fluid system, such as a lake, a stream, a waterfall, the atmosphere, mid-air, etc. To facilitate the entry of the fluid into the electrical generator 200, the electrical generator 200 may employ funnel 284. The funnel 284 directs fluid from the open-flowing fluid system into the electrical generator 200 to produce electricity in the manner described above. In another embodiment, a funnel may also be coupled to the exiting end 286 of the electrical generator 200.

Referring to FIG. 9, another illustrative embodiment of a rotor 302 is shown that includes the rotor magnet 380. Elements of FIG. 9 that are analogous to elements in FIG. 1-7 have been shown by indexing the reference numerals by 200. In contrast to the rotors described in FIGS. 1 through 8, fluid does not flow through the rotor 302, and the rotor 302 instead includes a solid, or substantially solid, rotor magnet 380 mounted on a central axis, or bar, 388. The rotor 302 includes the first and second end rings 326, 330.

Instead of utilizing fluid flowing through the rotor 302 for rotational propulsion, the rotor 302 may utilize a motor 390 that rotates the rotor 302. The rotor 302 may be used in conjunction with the suspension system described in FIGS. 1 through 7, including the housing 106, the rotor interfaces 164, 165, and all or a portion of the magnets 162, 163, 166, 168, 167, 169 coupled thereto; thus, the rotor magnet 380 may be disposed in the internal cavity 104 of the housing 106. The rotor 302 and the surrounding suspension structure may be in the presence of a vacuum or reduced-pressure area, which may further reduce the friction between the rotor 302 and the surrounding structure. The motor 390 may rotate the rotor 302 to cause the rotor magnet 380 to rotate relative to surrounding coils and thereby produce an electric current. Although FIG. 9 shows only one rotor magnet 380, the rotor 302 may include any number of rotor magnets.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. An apparatus comprising:
   a housing forming an internal cavity;
   a rotor disposed in the internal cavity of the housing, the rotor having a first end and a second end;
   a first end ring coupled to the first end of the rotor; and
   a second end ring coupled to the second end of the rotor, wherein the first end ring and the second end ring are each magnetically repulsed from the housing to cause the rotor to be suspended relative to the housing;
   wherein the first end ring comprises an inner-facing surface, a circumferential surface, and an outer-facing surface;
   wherein the first end ring has a magnetic polarity;
   wherein the second end ring comprises an inner-facing surface, a circumferential surface, and an outer-facing surface;
   wherein the second end ring has the magnetic polarity;
   wherein the housing has a first end adapted to face the inner-facing surface of the first end ring, the first end of the housing comprising a first housing magnet having the same magnetic polarity as the first end ring;
   wherein the housing has a second end adapted to face the inner-facing surface of the second end ring, the second end of the housing comprising a second housing magnet having the same magnetic polarity as the second end ring;
   wherein the apparatus further comprises a first rotor interface adjacent the first end of the rotor, the first rotor interface comprising a first circumferential interface magnet and a first outer interface magnet, the first circumferential interface magnet facing the circumferential surface of the first end ring and having the same magnetic polarity as the first end ring, the first outer interface magnet facing the outer-facing surface of the first end ring and having the same magnetic polarity as the first end ring; and
   wherein, the apparatus further comprises a second rotor interface adjacent the second end of the rotor, the second rotor interface comprising a second circumferential interface magnet and a second outer interface magnet, the second circumferential interface magnet facing the circumferential surface of the second end ring and having the same magnetic polarity as the second end ring, the second outer interface magnet facing the outer-facing surface of the second end ring and having the same magnetic polarity as the second end ring.

2. The apparatus of claim 1, wherein the first and second housing magnets, the first and second circumferential interface magnets, and the first and second outer interface magnets each have a ring shape.

3. The apparatus of claim 1, wherein the rotor forms an internal flow passage in fluid communication with a fluid conduit.

4. The apparatus of claim 1, wherein the first end ring forms a first aperture defined by a first inner end ring surface;
   wherein the second end ring forms a second aperture defined by a second inner end ring surface;
   wherein the first end of the rotor is coupled to the first inner end ring surface; and
   wherein the second end of the rotor is coupled to the second inner end ring surface.

5. The apparatus of claim 1, wherein the first and second end rings each have an outer diameter;
   wherein the rotor has a diameter; and
   wherein the outer diameter of each of the first and second end rings is larger than the diameter of the rotor.

6. The apparatus of claim 1, wherein the rotor has an internal surface forming an internal flow passage, the apparatus further comprising:
   a spiraling fin coupled to the internal surface of the rotor, wherein fluid flow through the internal flow passage causes the spiraling fin and the rotor to rotate within the internal cavity of the housing.

7. The apparatus of claim 1, further comprising:
   a motor operatively coupled to the rotor, the motor operable to rotate the rotor within the internal cavity of the housing.

8. The apparatus of claim 1, wherein the first and second end rings are at least partially formed from magnets having the magnetic polarity.

9. The apparatus of claim 8, wherein the first, end ring comprises one or more first end ring magnets having the magnetic polarity; and
   wherein the second end ring comprises one or more second end ring magnets having the magnetic polarity.

10. The apparatus of claim 1, further comprising:
    one or more strips that at least partially spiral around an outer surface of the rotor.

11. An apparatus comprising:
    a housing forming an internal cavity, the housing comprising one or more coils;
    a rotor disposed in the internal cavity of the housing, the rotor having a first end and a second end, the rotor having an internal surface forming an internal flow passage, the rotor comprising one or more rotor magnets;
    a fin coupled to the internal surface of the rotor;
    a first end ring coupled to the first end of the rotor; and
    a second end ring coupled to the second end of the rotor;
    wherein the first and second end rings are magnetically repulsed from the housing to cause the rotor to be suspended relative to the housing;
    wherein the fin is operable to engage with fluid flowing through the internal flow passage to cause the rotor to rotate and the one or more rotor magnets to move relative to the one or more coils;
    wherein the fin is a spiraling plane having a first longitudinal edge and a second longitudinal edge, the first longitudinal edge and the second longitudinal edge fixedly coupled to the internal surface of the rotor; and
    wherein the fin longitudinally bisects the internal flow passage.

12. The apparatus of claim 11 wherein the rotor is in a substantially non-touching relationship with the housing when the rotor is suspended relative to the housing.

13. An apparatus comprising:
    a housing forming an internal cavity, the housing comprising one or more coils;
    a rotor disposed in the internal cavity of the housing, the rotor having a first end and a second end, the rotor having an internal surface forming an internal flow passage, the rotor comprising one or more rotor magnets;
    a fin coupled to the internal surface of the rotor;
    a first end ring coupled to the first end of the rotor; and
    a second end ring coupled to the second end of the rotor;
    wherein the first and second end rings are magnetically repulsed from the housing to cause the rotor to be suspended relative to the housing;
    wherein the fin is operable to engage with fluid flowing through the internal flow passage to cause the rotor to rotate and the one or more rotor magnets to move relative to the one or more coils;
    wherein the housing has an internal surface forming the internal cavity;
    wherein the rotor is suspended relative to the housing such that an outer flow space is formed between the rotor and the internal surface of the housing; and
    wherein the outer flow space is operable to transmit fluid in the same direction as the fluid flowing through the internal flow passage.

14. The apparatus of claim 11 wherein the housing has an internal surface forming the internal cavity;
    wherein the rotor is suspended relative to the housing such that an outer flow space is formed between the rotor and the internal surface of the housing;
    wherein the one or more rotor magnets are one or more magnetic strips that at least partially spiral around an outer surface of the rotor;
    wherein the one or more magnetic strips protrude from the outer surface of the rotor;
    wherein the outer flow space is operable to transmit fluid in the same direction as the fluid flowing through the internal flow passage; and
    wherein the one or more magnetic strips are operable to engage with the fluid flowing through the outer flow space to cause the rotor to rotate.

15. An apparatus comprising:
    a housing having an internal surface forming an internal cavity;
    a rotor disposed in the internal cavity of the housing, the rotor having an internal surface forming an internal flow passage; and
    a fin coupled to the internal surface of the rotor such that the fin is at least partially disposed in the internal flow passage;
    wherein the rotor is magnetically suspended within the internal cavity of the housing to form an outer flow space between the rotor and the internal surface of the housing;
    wherein the internal flow passage and the outer flow space are operable to transmit fluid in a same direction; and
    wherein the fin is operable to engage with fluid flowing through the internal flow passage to cause the rotor to rotate.

16. The apparatus of claim 15, further comprising:
    one or more strips that at least partially spiral around an outer surface of the rotor;
    wherein the one or more strips protrude from the outer surface of the rotor; and
    wherein one or more strips are operable to engage with fluid flowing through the outer flow space to cause the rotor to rotate.

17. The apparatus of claim 15, wherein the rotor has a first end and a second end;
    wherein the apparatus further comprises a first end ring coupled to the first end of the rotor; and
    wherein the apparatus further comprises a second end ring coupled to the second end of the rotor.

18. The apparatus of claim 17, wherein the housing has a first end adapted to face the first end ring, the first end of the housing comprising a first housing magnet having a magnetic polarity;
- wherein the housing has a second end adapted to face the second end ring, the second end of the housing comprising a second housing magnet having the magnetic polarity;
- wherein the first end ring has the same magnetic polarity as the first housing magnet; and
- wherein the second end ring has the same magnetic polarity as the second housing magnet.

19. The apparatus of claim 17, further comprising:
a first rotor interface adjacent the first end of the rotor, the
- first rotor interface comprising one or more first interface magnets having a magnetic polarity; and
- a second rotor interface adjacent the second end of the rotor, the second rotor interface comprising one or more second interface magnets having the magnetic polarity;
- wherein the first end ring has the same magnetic polarity as the one or more first interface magnets; and
- wherein the second end ring has the same magnetic polarity as the one or more second interface magnets.

20. The apparatus of claim 15, wherein the internal flow passage of the rotor is in fluid communication with a fluid conduit.

* * * * *